United States Patent
Iida et al.

(10) Patent No.: US 6,984,423 B2
(45) Date of Patent: Jan. 10, 2006

(54) INK JET RECORDING PAPER

(75) Inventors: Seiichiro Iida, Ibaraki (JP); Yasuo Iwasa, Ibaraki (JP)

(73) Assignee: Yupo Corporation, Tokyo (JP)

( * ) Notice: Subject to any disclaimer, the term of this patent is extended or adjusted under 35 U.S.C. 154(b) by 103 days.

(21) Appl. No.: 10/244,075

(22) Filed: Sep. 16, 2002

(65) Prior Publication Data

US 2003/0118790 A1  Jun. 26, 2003

Related U.S. Application Data

(63) Continuation of application No. PCT/JP01/01917, filed on Mar. 12, 2001.

(30) Foreign Application Priority Data

Mar. 14, 2000  (JP) .......................... P. 2000-069740
May 26, 2000  (JP) .......................... P. 2000-156093

(51) Int. Cl.
   *B41M 5/40* (2006.01)
(52) U.S. Cl. .............. 428/32.17; 428/32.18; 428/32.26; 428/32.28; 428/32.3; 428/32.34
(58) Field of Classification Search ............ 428/32.17, 428/32.18, 32.26, 32.28, 32.3, 32.34
   See application file for complete search history.

(56) References Cited

U.S. PATENT DOCUMENTS

| | | | |
|---|---|---|---|
| 5,635,297 A * | 6/1997 | Ogawa et al. | 428/342 |
| 2002/0012786 A1 * | 1/2002 | Iwasa et al. | 428/317.9 |
| 2002/0028320 A1 * | 3/2002 | Iwasa et al. | 428/195 |
| 2003/0118790 A1 | 6/2003 | Iida et al. | |

FOREIGN PATENT DOCUMENTS

| | | |
|---|---|---|
| EP | 0 855 420 A2 * | 7/1998 |
| EP | 0 878 322 A2 | 11/1998 |
| EP | 903 246 A2 | 3/1999 |
| EP | 1 279 697 | 1/2003 |
| JP | 8-12871 A | 1/1996 |
| JP | 9-207429 A | 8/1997 |
| JP | 10-181188 A | 7/1998 |
| JP | 11-91235 A | 4/1999 |
| JP | 11-235865 A | 8/1999 |
| JP | 2000-190433 A | 7/2000 |
| JP | 2001-139710 A | 5/2001 |

OTHER PUBLICATIONS

Computer translated English copy of JP 10-204196.*
Computer translated English copy of JP 11-078269.*
U.S. Appl. No. 10/941,845, filed Sep. 16, 2004, Iwasa et al.

* cited by examiner

*Primary Examiner*—B. Shewareged
(74) *Attorney, Agent, or Firm*—Oblon, Spivak, McClelland, Maier & Neustadt, P.C.

(57) ABSTRACT

The present invention provides less expensive ink jet recording papers having high glossiness and high durability and being capable of quickly absorbing inks without causing bleeding. Accordingly, the present invention provides an ink jet recording paper having an ink-receiving layer provided on a porous resin film, wherein the porous resin film has a liquid absorption capacity measured in accordance with "Japan TAPPI No.51-87" of 0.5 ml/m2 or above and the ink-receiving layer has a surface glossiness (JIS-Z8741: measuring method at 60°) of 40% or above. It is preferable that the ink jet recording paper contains at least one member selected from among alumina, alumina hydrate and amorphous silica in the ink-receiving layer.

23 Claims, No Drawings

INK JET RECORDING PAPER

TECHNICAL FIELD

This invention relates to ink jet recording papers having high glossiness, high durability and excellent ink jet suitability.

BACKGROUND ART

Ink jet recording, a non-contact type recording system using water inks, has been rapidly spreading in recent years for various purposes, such as hard copy apparatuses for colored graphic data including Chinese characters due to the advantages thereof, for example, high printing speed, low noise level, ease of multi-color printing, high recording pattern flexibility, and the lack of a need for development or fixation.

Due to recent progress in high-speed printing and microprocessing, images obtained by ink jet printing are comparable in quality to images obtained by the conventional multi-color printing methods, such as offset printing. For a small number of copies, the ink jet printing is less expensive than the conventional plate making systems. Under these circumstances, attempts have been made to apply the ink jet printing to multi-color printing in addition to color photography recording. Moreover, attempts have been also made to replace dye inks having poor water resistance with pigment inks that have excellent water resistance and light resistance properties so as to enlarge the application range of ink jet printers to the formation of large-size posters and signboards for outdoor installation.

With the progress in ink jet printers, there is a corresponding requirement to improve the qualities of recording media.

For use in large-size posters and signboards for outdoor installation, for example, recording media should not only have high absorptivity of water inks, but also should have high water resistance to prevent the disappearance of prints even in bad weather and they should have high durability to resist tearing by strong wind.

To obtain high-grade prints from photographic output sources, such as printing photographs taken by digital cameras, recording media should have high glossiness and high water absorptivity.

As ink jet recording papers for the above-described purposes, there have been developed and marketed ink jet recording papers having highly gloss ink-receiving layer formed on pulp papers, plastic films or synthetic papers.

Although ink jet recording papers composed of a pulp paper substrate and high-gloss ink-receiving layer formed thereon for the above-described purposes have satisfactory glossiness and ink absorptivity, the substrate is susceptible to tearing. Thus, these ink jet recording papers suffer from a serious durability problem as a medium.

There have been frequent proposals to use plastic films or synthetic papers as highly durable substrates. In particular, a large number of plastic films having excellent glossiness and ink fixation properties have been proposed in which alumina compounds are used in the ink-receiving layer. For example, ink jet recording papers using an ink-receiving layer containing alumina, alumina hydrate and the like having excellent water absorptivity are disclosed in Japanese Patent Laid-Open No. 276670/1990, ibid. No. 215082/1991, ibid. No. 24335/1993, ibid. No. 218324/1994, ibid. No. 76161/1995, ibid. No. 34484/1999, ibid. No. 91236/1999, ibid. No. 91238/1999, ibid. No. 91242/1999, etc. In these cases, however, plastic films employed as the substrate have no water ink absorptivity, and as such it is necessary to provide an ink-receiving layer at a high coating dose. As a result, some problems arise; such as frequent cracking in the coating layer and repeated coating operations resulting in high costs.

To solve the above-described problems, the present inventors have found that a porous resin film having a liquid absorption capacity measured in accordance with "Japan TAPPI No. 51-87" of 0.5 ml/m$^2$ or above has high durability and absorbs water-based liquids well, and a porous resin film having a surface contact angle of 110° or below can uniformly absorb an ink even at a high ink jet rate so that these porous resin films are appropriate for media in, for example, ink jet recording (Japanese Patent Application No. 320769/1999).

Although the above-described porous resin films have high ink absorptivity, they still suffer from some troubles, for example, they frequently show ink bleeding, have low water resistance against dye inks due to poor ink fixation properties, and give only less satisfactory appearance of prints due to low surface glossiness. That is to say, these films still need to be improved in ink bleeding, water resistance, and surface glossiness.

The present invention aims at providing less expensive ink jet recording papers having high glossiness and high durability and being capable of quickly absorbing inks without causing bleeding.

DISCLOSURE OF THE INVENTION

To solve the problems as described above, the present inventors have conducted intensive studies. As a result, they have discovered that ink jet recording papers having an ink-receiving layer with a glossiness of a definite level or above provided on the porous resin film that had been previously proposed by the present inventors (Japanese Patent Application No. 320769/1999) are excellent in glossiness and durability and quickly absorb inks for ink jet printing without causing bleeding.

The present inventors have further discovered that in case of using the above-described porous resin film, ink jet suitability can be satisfied by providing an ink-receiving layer at a low coating dose compared to the conventional resin film substrates, namely, ink jet recording papers can be produced at a lower cost, thereby completing the present invention.

Accordingly, the present invention provides an ink jet recording paper having an ink-receiving layer provided on a porous resin film, wherein the porous resin film has a liquid absorption capacity measured in accordance with "Japan TAPPI No. 51-87" of 0.5 ml/m$^2$ or above and the ink-receiving layer has a surface glossiness (JIS-Z8741: measuring method of 60°) of 40% or above.

It is preferable that the ink-receiving layer contains from 70 to 95% of an inorganic filler having an average particle diameter of 350 nm or below and from 5 to 30% by weight of a binder resin. In particular, it is preferable that the inorganic filler is at least one member selected from alumina, alumina hydrate and amorphous silica.

δ-Alumina is the preferred alumina, while pseudoboehmite is the preferred alumina hydrate.

As the inorganic filler, amorphous silica is preferred and it is more preferred that the amorphous silica comprises primary particles having an average particle diameter of 1 to 10 nm aggregating together. It is even more preferred that the amorphous silica is cation-treated silica.

In the present invention, the ink-receiving layer may contain at least one member selected from a crosslinking agent and an ink fixer. The content of the crosslinking agent is from 1 to 20% by weight, while the content of the ink fixer is from 1 to 20% by weight.

In the present invention, it is preferred that a top coat layer is further formed on the ink-receiving layer and the surface glossiness (JIS-Z8741: measuring method of 60°) is 50% or above.

It is preferred that the top coat layer contain from 70 to 95% by weight of an inorganic filler having an average particle diameter of 350 nm or below and from 5 to 30% of a binder resin. It is also preferred that the top coat layer contain 1 to 20% by weight of an ink fixer.

It is preferred that the porous resin film according to the present invention has a liquid absorption capacity measured in accordance with "Japan TAPPI No. 51-87" of 5.0 ml/m$^2$ or above and a surface glossiness (JIS-Z8741: measuring method of 60°) of 20% or above.

It is preferred that the porous resin film has an average contact angle to water of 110° or below. It is also preferred that the porous resin film have pores on the surface and inside thereof and its porosity is 10% or above.

Concerning the composition, the porous resin film contains a thermoplastic resin and 10 to 70% by weight of a fine inorganic or organic powder. It is preferred that the average particle diameter of the fine inorganic or organic powder ranges from 0.01 to 20 μm. It is more preferred that the specific surface area of the fine inorganic or organic powder is 0.5 m$^2$/g or above.

The thermoplastic resin is a hydrophilic thermoplastic resin or a mixture of a non-hydrophilic thermoplastic resin with a hydrophilic thermoplastic resin. The non-hydrophilic thermoplastic resin is a polyolefin resin and the hydrophilic thermoplastic resin has a water absorption ratio within 30 minutes of 5 g/g or above or the hydrophilic thermoplastic resin is soluble in water.

It is preferred that the hydrophilic thermoplastic resin is a product of a reaction between an alkylene oxide compound and a dicarboxylic acid compound. In a more preferred embodiment of the present invention, the porous resin film has been orientated.

BEST MODE FOR CARRYING OUT THE INVENTION

The ink jet recording paper of the present invention is described in detail below.

[Porous Resin Film]

The porous resin film according to the present invention has a liquid absorption capacity of 0.5 ml/m$^2$ or above, preferably 5 ml/m$^2$ or above.

When the liquid absorption capacity is less than 0.5 ml/m$^2$, the film fails to sufficiently absorb an ink jet ink, which makes it difficult to reduce the coating doses of the ink-receiving layer, i.e., one of the objects of the present invention. The thickness of the porous film should be taken into consideration to elevate the liquid absorption capacity. Thus, the upper limit of the liquid absorption capacity is appropriately determined depending on the base material thickness and the ink-receiving layer.

In the present invention, the liquid absorption capacity of the porous resin film is measured in accordance with "Japan TAPPI No. 51-87" (Japan Technical Association of Pulp and Paper Industry, Pulp and Paper Test Method No. 51-87, Bristow's method). In the present invention, the value measured within an absorption period of 2 seconds is referred to as the liquid absorption capacity. As the measuring solvent, a solvent mixture (100% by weight) comprising 70% by weight of water and 30% by weight of ethylene glycol to which a coloring dye is also added is used. As the coloring dye malacite green, etc., may be made. The dye may be in an amount of about 2 parts by weight per 100 parts by weight of the solvent mixture, though the type and amount of the coloring dye to be used are not particularly restricted so long as the surface tension of the solvent to be used in the measurement is not substantially changed thereby.

As an example of a measuring instrument, a liquid absorption test machine manufactured by Kumagai Riki Kogyo K.K. may be used.

A higher ink absorption speed can be obtained at a larger liquid absorption capacity within a shorter period of time. In the present invention, the liquid absorption capacity within 40 milliseconds is 0.8 ml/m$^2$ or above, still preferably from 1 to 500 ml/m$^2$.

Moreover, the absorption in the heavy color region and drying are seemingly improved at a higher liquid absorption speed, which is measured in association with the measurement of the above-described liquid absorption capacity. In the present invention, the absorption speed in 20 milliseconds to 40 milliseconds is generally 0.02 ml/$\{m^2 \cdot (ms)^{1/2}\}$ or above, preferably from 0.1 to 100 ml/$\{m^2 \cdot (ms)^{1/2}\}$ or above.

It is preferred that the porous resin film according to the present invention has a surface glossiness (JIS-Z8741: measuring method of 60°) of 20% or above.

It is not favorable for the surface glossiness of the porous resin film to be less than 20%, since the glossiness of the ink-receiving layer provided on the porous resin film is lowered in this case.

The average surface contact angle to water of the porous resin film according to the present invention is 110° or below, preferably from 20 to 100° and more preferably from 20 to 80°. In ink jet recording, it is particularly preferable that the surface contact angle to water ranges from 45 to 80°.

To achieve penetration of an ink jet ink at a preferable level, the surface contact angle to water is 110° or below. Based on the balance between the spread of an ink jet ink in the direction parallel to the film paper plane and the penetration thereof in the film thickness direction, the surface contact may be appropriately selected in some cases depending on the ink type.

In the present invention, the water contact angle of the film surface is measured by using a marketed contact angle meter. One minute after dropping pure water on the film surface, the contact angle is measured with a dynamic contact angle meter. The measurement is repeated 10 times for each sample. After the completion of each measurement procedure, a fresh film having a dry surface replaces the used film. The average of the data thus obtained is referred to as the water contact angle. As an example of the marketed contact angle meter usable in measuring the contact angle in the present invention, a contact angle meter Model CA-D (manufactured by Kyowa Kaimen Kagaku K.K.) may be cited.

A smaller "difference between the maximum and minimum contact values" in the measurement of the contact angle repeated 10 times seemingly indicates a more uniform absorption of ink or a liquid containing a water-based vehicle. Preferred printing qualities can be obtained in such a case. For example, the difference between the maximum and minimum values is 40° or below, preferably 30° or below and more preferably 15° or below.

According to the present invention, the porous resin film has fine pores on the surface and a water-based liquid, such as a water ink, being in contact with the surface, which is absorbed via these pores. The number and shape of the pores on the surface of the porous resin film may be determined by microscopic observation.

Namely, the pore shape can be observed by forming an arbitrary slice of the porous resin film sample, bonding the slice on a sample table, metallizing the face of the slice to be observed with gold, gold/palladium, etc. and then observing it under an electron microscope (for example, a scanning electron microscope Model S-2400 manufactured by Hitachi) at an arbitrary magnification adequate for the observation. Thus, the number, size and shape of the pores can be understood. The number of the pores is calculated based on the number of the pores counted in the microscopic field.

The number of pores per unit area of the porous resin film surface is $1 \times 10^6 / m^2$ or above. From the viewpoint of elevating the penetration speed of an ink jet ink, a pore number of $1 \times 10^8 / m^2$ or above is preferred. For achieving a surface strength at a favorable level, a pore number of $1 \times 10^{15} / m^2$ or below is preferred and $1 \times 10^{12} / m^2$ or below is more preferred.

The pores around the surface of the porous resin film may be in various shapes such as circle or ellipse. The average of the maximum diameter (L) of each pore and the maximum diameter (M) in the orthogonal direction [(L+M)/2] is referred to as the average diameter. The diameters of at least 20 surface pores are repeatedly measured and the average is referred to as the average diameter of the surface pores of the porous resin film according to the present invention. To obtain an improved liquid absorptivity, the average diameter is 0.01 μm or above, preferably 0.1 μm or above and more preferably 1 μm or above. To achieve a surface strength of the porous resin film at an improved level, the average diameter is 100 μm or below, preferably 50 μm or below and more preferably 30 μm or below.

The porous resin film according to the present invention has a porous structure having fine pores inside. To achieve water ink-absorption and drying properties at a favorable level, the porosity is 10% or above, preferably 20 to 75% and more preferably 30 to 65%. When the porosity is 75% or below, a film material strength at a favorable level can be obtained. The fact that the porous resin film has pores inside thereof can be ascertained by observing the section thereof under an electron microscope.

In the present invention, the porosity means the porosity calculated in accordance with the following formula or the area ratio (%) of the pores in the area of the section observed under an electron microscope. The porosity represented by the following formula and the area ratio have the same meaning as each other. More specifically, the porous resin film is embedded in an epoxy resin and is solidified. Then, it is sliced, for example, in the direction parallel to the thickness direction and orthogonal to the plane direction using a microtome. Then this sectional slice is metallized and observed under a scanning electron microscope at an arbitrary magnification adequate for the observation (for example, 500 to 2000× magnification). Alternatively, the porosity may be determined by taking an electron microscopic photography and then analyzing the image to measure the area of pores observed in the field. In an example for determining the area ratio, the pores are traced onto a tracing film and painted over. Then the obtained image is processed with an image analyzer (Model Luzex IID manufactured by NIRECO Corporation) to determine the pore area ratio (%), i.e., the porosity.

$$\text{Porosity} = \frac{\rho_0 - \rho_1}{\rho_0} \times 100$$

According to the present invention, a laminate having the porous resin film on the surface thereof, the thickness and weight of the porous resin film are calculated from the thickness and basis weight (g/m²) of the laminate and those of the part obtained by removing the porous resin film therefrom. Then the density ($\rho_1$) of the porous resin film is determined. Further, the true density ($\rho_0$) is determined from those composition ingredient and thus the porosity can be calculated in accordance with the above formula.

The shape and size of the internal pores can be observed under a scanning electron microscope at an arbitrary magnification adequate for the observation (for example, 200 to 2000× magnification).

Measuring the length of the diameter in the plane direction and the length of the diameter in the thickness direction of at least 10 internal pores and then calculating the respective averages determine the internal pore size.

The average length in the plane direction of the pores of the porous resin film ranges from 0.1 to 1000 μm, preferably from 1 to 500 μm. To impart a mechanical strength at a higher level to the porous resin film, it is preferred that the maximum length in the film plane direction of the pores be 1000 μm or below. To obtain a water-based liquid absorption properties at a higher level, it is preferred that the maximum length in the film plane diameter of the pores be 0.1 μm or above.

The average length in the thickness direction of pores of the porous resin film according to the present invention usually ranges from 0.01 to 50 μm, preferably from 0.1 to 10 μm. To improve the water-based liquid absorption properties, a longer length in the thickness direction is the better. The upper limit can be determined by considering the achievement of an adequate mechanical strength of the film.

<Composition of Porous Resin Film and Production Method>

According to the present invention, it is preferred that the porous resin film contain from 30 to 90% by weight of a thermoplastic resin including a hydrophilic resin and from 10 to 70% by weight of a fine inorganic or organic powder.

The thermoplastic resin may be either a mixture of a non-hydrophilic thermoplastic resin with a hydrophilic thermoplastic resin or a hydrophilic thermoplastic resin alone. It is preferred that the thermoplastic resin is a mixture of a non-hydrophilic thermoplastic resin with a hydrophilic thermoplastic resin. When the thermoplastic resin is a mixture of a non-hydrophilic thermoplastic resin with a hydrophilic thermoplastic resin, it is preferred that the content of the hydrophilic thermoplastic resin range from 5 to 100 parts by weight, more preferably from 10 to 60 parts by weight, per 100 parts by weight of the non-hydrophilic thermoplastic resin.

Examples of the non-hydrophilic thermoplastic resin to be used in the porous resin film according to the present invention include ethylene-based resins, such as high density polyethylene, medium density polyethylene and low density polyethylene; polyolefin-based resins, such as propylene-based resins; polymethyl-1-pentene; ethylene-cyclic olefin copolymers; polyamide-based resins, such as nylon-6, nylon-6,6, nylon-6,10, nylon-6,12 and nylon-6,T; polyethylene terephthalate and its copolymers; polyethylene naphthalate; thermoplastic polyester-based resins, such as aliphatic polyesters; and thermoplastic resins, such as polycarbonate, atactic polystyrene, syndiotactic polystyrene and polyphenylene sulfide. It is also possible to use mixtures of two or more of these resins.

In particular, ethylene-based resins or polyolefin resins, such as propylene-based resins, are preferred based on chemical resistance, low specific gravity, cost, etc., and propylene-based resins are even more preferable. Examples of the propylene-based resins include isotactic polymers and syndiotactic polymers obtained by homopolymerization of propylene. Also, use can be made of copolymers containing as the main component polypropylene having various tacticities, which are obtained by copolymerizing propylene with α-olefins such as ethylene, 1-butene, 1-hexene, 1-heptene, and 4-methyl-pentene. Such a copolymer may be either a bipolymer or a terpolymer or higher. Also, it may be either a random copolymer or a block copolymer. It is preferred that the propylene-based resin is used in the form of a blend with 2 to 25% by weight of another resin having a lower melting point than that of a propylene homopolymer. Examples of a low-melting resin include high density polyethylene and low density polyethylene.

The hydrophilic thermoplastic resin is not particularly restricted, so long as it is dissolved in water or swells therein and has a plasticity at ordinary temperature or above.

For example, use can be made therefor of polyvinyl-based resins such as polyvinyl alcohol, copolymers thereof, crosslinked derivatives thereof, polyvinylpyrrolidone and copolymers thereof; polyacrylic resins and salts thereof (for example, sodium salts, potassium salts, lithium salts, primary to quaternary ammonium salts) such as polymers of acrylic acid esters, methacrylic acid esters and maleic acid esters containing a hydroxyalkyl group (for example, 2-hydroxyethyl, 2-hydroxypropyl), copolymers thereof, crosslinked derivatives thereof, polyacrylamide and copolymers thereof, hydrolyzates of acrylonitrile polymers and crosslinked polymers, polymers of acrylic acid and methacrylic acid, copolymers thereof and crosslinked derivatives thereof; polymaleic acid, maleic acid copolymers, crosslinked derivatives thereof and salts thereof (for example, sodium salts, potassium salts, lithium salts, primary to quaternary ammonium salts) and vinyl acetate/methyl methacrylate copolymer hydrolyzate; water-soluble nylons; urethane-based resins, i.e., water-soluble polyurethane, highly water absorptive polyurethane and thermoplastic polyurethane; polyalkylene oxide-based resins such as polyethylene oxide and copolymers thereof, polypropylene oxide and copolymers thereof; polyether amides and polyether ester amides; and polyvinylamine, polyallylamine and copolymers thereof.

Moreover, it is possible to use a resin selected from those cited in *Kobunshi Kako* (1984), No. 9, pp. 32–38. In particular, it is preferred that a resin showing plasticity at ordinary temperature or above and can be relatively easily shaped into a film be used.

To further improve the absorbing properties of an aqueous solvent or a water ink, it is preferable that the resin be dissolved in water or has a water absorption ratio of 5-fold or above, more preferably form 8- to 50-fold, within 30 minutes at ordinary temperature. The water absorption ratio can be determined by molding a hydrophilic resin into a sheet of about 0.1 mm in thickness by using a T-die connected to an extruder or a heat press, soaking it in distilled water at ordinary temperature (for example, 25° C.) for 30 minutes to allow water absorption, and then dividing the weight after absorbing water by the weight before absorbing water.

As the hydrophilic thermoplastic resin, natural resins with poor heat resistance (for example acacia, tragacanth gum, corn starch, wheat starch, collagen) are not favored, since they can hardly be used at a temperature for melting plastics.

In particular, a polyalkylene oxide-based resin that has plasticity at ordinary temperature or above and can be relatively easily shaped into a film is preferred.

Examples of the polyalkylene oxide resin to be used in the present invention include products obtained by reacting alkylene oxides with dibasic acids or polybasic acids having three or more carboxyl groups; ester bond-containing polyester-based polyalkylene oxides exemplified by products obtained by reacting polyalkylene oxide compounds with dicarboxylic acid compounds, lower alkyl ester compounds thereof, carboxylic acids having three or more carboxyl groups or lower alkyl ester compounds thereof; urethane bond-containing polyurethane-based polyalkylene oxides exemplified by products obtained by reacting polyalkylene oxide compounds with compounds having two or more isocyanate groups; carbonate bond-containing polyalkylene oxides exemplified by products obtained by reacting polyalkylene oxide compounds with carbonic acid diester compounds such as dialkyl carbonates; amide bond-containing polyalkylene oxides; urea- or thiourea bond-containing polyalkylene oxides; sulfide- or sulfonyl bond-containing polyalkylene oxides; and phosphate- or phosphite-bond containing polyalkylene oxides.

Among these resins, an ester bond-containing polyalkylene oxide is preferred to achieve mixing/dispersion properties with the non-hydrophilic thermoplastic resin at a higher level.

The alkylene oxide is not particularly restricted in type. Examples thereof include ethylene oxide, propylene oxide, 1,2-epoxybutane, 1,2-epoxypentane, 1,2-epoxyhexane and other α-olefin oxides having up to 30 carbon atoms. In particular, ethylene oxide, propylene oxide, 1,2-epoxybutane or 1,2-epoxyhexane are preferred. Any one of these alkylene oxides or a combination of two or more thereof may be used. In case of using two or more alkylene oxides, they may be reacted either one by one or as a mixture thereof.

Although the polyalkylene oxide compound is not particularly restricted, it is preferable to use a polymer or a copolymer of the above-described alkylene oxide(s) having a weight-average molecular weight of from 5,000 to 30,000. To achieve film-forming properties at a higher level, the weight-average molecular weight of 5,000 or above is preferred. In producing the polyalkylene-based resin, the alkylene oxide addition reaction proceeds at a relatively high reaction speed and a favorable productivity is established at a weight-average molecular weight of 30,000 or below.

The polyalkylene oxide compound may be obtained by addition-polymerizing the alkylene oxide. It is preferable, for example, to use a polyalkylene oxide compound obtained by addition-polymerization of an organic compound having two active hydrogen atoms with the alkylene oxide.

Examples of the organic compound having two active hydrogen atoms include diols, such as ethylene glycol, diethylene glycol, propylene glycol, dipropylene glycol, 1,4-butanediol, 1,6-hexanediol, neopentyl glycol, bisphenol A, polytetramethylene glycol and cyclohexane-1,4-dimethanol; and amines, such as butylamine, laurylamine, octylamine, cyclohexylamine and aniline, though the present invention is not particularly restricted thereto. Any one of these organic compounds having two active hydrogen atoms or a combination of two or more thereof may be used.

Among these compounds, it is preferable to use one of ethylene glycol, diethylene glycol, propylene glycol, dipropylene glycol, 1,4-butanediol or 1,6-hexanediol.

The alkylene oxide for addition-polymerization with the organic compound having two active hydrogen atoms is not particularly restricted. Examples thereof include ethylene oxide, propylene oxide, 1,2-epoxybutane, 1,2-epoxypentane, 1,2-epoxyhexane and other α-olefin oxides having up to 30 carbon atoms. Any one of these alkylene oxides or a combination of two or more thereof may be used. In case of using two or more alkylene oxides, they may be reacted either one by one or as a mixture thereof.

A preferable polyalkylene oxide compound is one obtained by addition-polymerization of an organic compound having two active hydrogen atoms with ethylene oxide, then addition-polymerization of an alkylene oxide having four or more carbon atoms and further addition-polymerization of an ethylene oxide. By reacting the polyalkylene oxide compound thus obtained with dicarboxylic acid compound, a polyalkylene oxide-based resin having a relatively high compatibility with a non-hydrophilic resin, in particular, a polyolefin-based resin can be obtained. Accordingly, a film produced by mixing the polyalkylene oxide-based resin with a polyolefin-based resin can absorb printing ink well and thus shows an improved absorption uniformity.

The structure of the carboxylic acid or a lower alkyl ester thereof to be reacted with the polyalkylene oxide compound is not particularly restricted, so long as it has two or more (preferably two) carboxylate groups or groups inducible into carboxylate groups in its molecule. Specific examples thereof include linear, branched, alicyclic or aromatic di- and tri-carboxylic acids having 6 to 36, preferably 8 to 24, carbon atoms, and lower alkyl esters of at least one of these di- and tri-carboxylic acids.

More particularly speaking, examples thereof include sebacic acid, 1,10-decamethylenedicarboxylic acid, 1,14-tetradecamethylenedicarboxylic acid, 1,18-octadecamethylenedicarboxylic acid, 1,32-dotriacontamethylenedicarboxylic acid, cyclohexanedicarboxylic acid, phthalic acid, terephthalic acid, isophthalic acid, various isomers of naphthalenedicarboxylic acid, 4,4'-biphenylenedicarboxylic acid and lower alkyl esters thereof. In particular, at least one of linear dicarboxylic acids having 12 to 36 carbon atoms and lower alkyl esters of linear dicarboxylic acids having 12 to 36 carbon atoms are preferred. In greater detail, it is preferable to use saturated linear aliphatic dicarboxylic acids having 12 to 36 carbon atoms, unsaturated linear aliphatic dicarboxylic acids having 12 to 36 carbon atoms and lower alkyl esters thereof.

Among the above-described compounds, it is more preferable to use linear dicarboxylic acids having 12 to 26 carbon atoms and lower alkyl esters thereof, particularly preferably linear dicarboxylic acids having 16 to 24 carbon atoms and lower alkyl esters thereof. Specific examples of the linear dicarboxylic acids having 12 to 36 carbon atoms as described above include 1,10-decamethylenedicarboxylic acid, 1,14-tetradecamethylenedicarboxylic acid, 1,18-octadecamethylenedicarboxylic acid, 1,32-dotriacontamethylenedicarboxylic acid, etc. Examples of the lower alkyl esters thereof as described above include methyl esters, dimethyl esters, ethyl esters, diethyl esters, propyl esters and dipropyl esters of these dicarboxylic acids. Any one of these compounds or a combination of two or more thereof may be used.

In particular, a polyalkylene oxide-based resin obtained by copolymerizing a polyalkylene oxide, which is obtained by addition-polymerization of an organic compound having two active hydrogen atoms selected from among ethylene glycol, diethylene glycol, propylene glycol, dipropylene glycol and 1,4-butanediol with an alkylene oxide containing ethylene oxide as the main component and selected from among propylene oxide, 1,2-epoxybutane and 1,2-epoxyhexane and having a molecular weight of from 10,000 to 30,000, with an aliphatic dicarboxylic acid having 12 to 36 carbon atoms or a lower alkyl ester thereof and having the total molecular weight of from 20,000 to 200000, more preferably from 80,000 to 160,000, is particularly preferred.

According to the present invention, it is preferable that the porous resin film contains a fine inorganic or organic powder to impart porosity thereto. The fine inorganic or organic powder may be in an amount of, for example, 10 to 70% by weight. Since fine organic powders mostly have low specific gravities, the content thereof preferably ranges from 10 to 50% by weight, more preferably from 15 to 40% by weight. For a fine inorganic powder, the content preferably ranges from 20 to 65% by weight, more preferably from 40 to 65% by weight. Although a larger content of the fine powder is preferred to increase pores, the content is preferably not more than 70% by weight to achieve a film surface strength of the porous resin film at a favorable level.

The type of fine inorganic or organic powder is not particularly restricted.

Examples of the fine inorganic powder include heavy calcium carbonate, light calcium carbonate, aggregated light calcium carbonate, silica having various pore capacities, zeolite, clay, talc, titanium oxide, barium sulfate, zinc oxide, magnesium oxide, diatomaceous earth, silicon oxide and composite fine inorganic powders having cores made of hydroxyl group-containing fine inorganic powder such as silica and shells made of aluminum oxide or hydroxide. In particular, heavy calcium carbonate, clay or diatomaceous earth are preferred, since these materials are less expensive and can exhibit favorable pore-forming properties in case of orientation.

To form pores, the fine organic powder is selected from non-compatible resins, which have a higher melting point or glass transition point than that of the thermoplastic resin to be used as the non-hydrophilic thermoplastic resin as described above. Specific examples thereof include polyethylene terephthalate, polybutylene terephthalate, polyamide, polycarbonate, polyethylene naphthalate, polystyrene, polymers and copolymers acrylic acid esters or methacrylic acid esters, melamine resin, polyimide, polyether ketone and polyphenylene sulfide. When a polyolefin-based resin is used as the non-hydrophilic thermoplastic resin, it is particularly preferable to use a fine organic powder selected from polyethylene terephthalate, polybutylene terephthalate, polyamide, polycarbonate, polyethylene naphthalate and polystyrene.

Among the fine inorganic and organic powders, fine inorganic powders are preferred due to the generation of less heat in the combustion step.

The average particle diameter of the fine inorganic or organic powder to be used in the present invention preferably ranges from 0.01 to 20 $\mu$m, more preferably from 0.1 to 10 $\mu$m and most preferably from 0.5 to 10 $\mu$m. Due the convenience of mixing with the hydrophilic thermoplastic resin or the non-hydrophilic thermoplastic resin, it is preferable that the average particle diameter thereof is 0.01 $\mu$m or above. To minimize difficulties, such as cutting during the orientation or deterioration in surface layer strength, in case of forming pores inside by orientation so as to improve absorption properties, it is preferable that the average particle diameter is 20 µm or below.

The particle diameter of the fine inorganic or organic powder to be used in the present invention can be determined based on the diameter corresponding to 50% in accumulation (i.e., 50% cumulative particle diameter) measured by, for example, using a particle size measurement apparatus such as a laser diffraction particle size measurement apparatus Microtrack™ (manufactured by K.K. Nikkiso). Alternatively, the particle diameter of a fine powder dispersed in the non-hydrophilic thermoplastic resin or the hydrophilic thermoplastic resin by melt-kneading and dispersion can be determined by measuring the diameters of at least 10 particles by observing the section of the porous resin film under an electron microscope and then calculating the average.

The specific surface area of the fine inorganic or organic powder to be used in the present invention, which is measured by the BET method, ranges, for example, from 0.1 to 1000 $m^2/g$, preferably from 0.2 to 700 $m^2/g$ and more preferably from 0.5 to 100 $m^2/g$.

Use of a fine inorganic or organic powder having a larger specific surface area contributes to the improvement in the absorption of an aqueous solvent or ink. When difficulties such as insufficient dispersion caused by classification or bubbling caused by accompanying air arise in the mixing step and dispersion with the hydrophilic thermoplastic resin or the non-hydrophilic thermoplastic resin arise, the upper limit of the specific surface area may be appropriately determined depending on the purpose. Moreover, fine inorganic or organic powders having various oil absorptions can be used. For example, the oil absorption (JIS-K-5101-1991, etc.) ranges from 1 to 300 ml/100 g, preferably from 10 to 200 ml/100 g.

As the fine powder to be used in the porous resin film according to the present invention, any one of the powders as described above or a combination of two or more thereof may be used. When a combination of two or more powders is used, a fine organic powder may be combined with a fine inorganic powder.

To blend and knead the fine powder with the thermoplastic resin, it is possible to add a dispersant, an antioxidant, a compatibilizer, a flame retardant, an UV stabilizer, a coloring pigment and so on, if necessary. When the porous resin film as a durable material is used, it is preferable to add an antioxidant, an UV stabilizer, etc. thereto. In case of using a fine organic powder, the type and content of a compatibilizer are highly important since the particle form is determined depending on these factors. Preferable examples of the compatibilizer for fine organic powders include epoxy-modified polyolefins and maleic acid-modified polyolefins. It is preferable to use the compatibilizer in an amount of from 0.5 to 10 parts by weight per 100 parts by weight of the fine organic powder.

In the mixing step, i.e., the hydrophilic thermoplastic resin with the non-hydrophilic thermoplastic resin and the fine inorganic or organic powder by melt-kneading or the like, it is efficacious to add a dispersion improver to thereby improve the dispersion and the dispersion stability or to lessen the difference between the maximum and minimum surface contact angles to thereby establish more uniform absorption of an aqueous liquid, if necessary.

Examples of the dispersion improvers include polar resin-type dispersion improvers exemplified by epoxy group-containing resins, such as ethylene-glycidyl methacrylate copolymer, ethylene-vinyl acetate-glycidyl methacrylate copolymer, glycidyl methacrylate graft-modified polypropylene and epoxidized polybutadiene-based polymer; acid-modified polyolefins, such as maleic acid-modified polypropylene; hydroxy group-containing polyolefins, such as 2-hydroxyethyl methacrylate; graft-modified polypropylene; and amino-modified polyolefins, such as 3,3-dimethylaminoethyl methacrylate graft-modified polypropylene; and phosphorus-type dispersion improvers exemplified by organic phosphorus compounds such as phosphite compounds and phosphonite compounds, more specifically, bis (2,4-di-t-butylphenyl)pentaerythritol diphosphite, bis(2,6-di-t-butyl-4-methylphenyl)pentaerythritol diphosphite, distearylpentaerythritol diphosphite, bis(nonylphenyl)pentaerythritol diphosphite and tetrakis(2,4-di-t-butylphenyl)-4, 4'-bisphenylene diphosphonite.

To achieve ink absorption at a higher level, a polar resin-type dispersion improver is used usually in an amount of 0.1 part by weight or above, preferably from 0.5 to 30 parts by weight and more preferably from 1 to 15 parts by weight, per 100 parts by weight of the non-hydrophilic thermoplastic resin, while a phosphorus type dispersion improver is used usually in an amount of 0.01 part by weight or above, preferably from 0.1 to 5 parts by weight and more preferably from 0.2 to 3 parts by weight, per 100 parts by weight of the non-hydrophilic thermoplastic resin.

To mix the components constituting the porous resin film according to the present invention, various publicly known methods can be used without particular restriction. The mixing temperature and time may be appropriately determined depending on the properties of the components employed. For example, mixing in the state dissolved or disperses in a solvent or the melt-kneading method may be cited. High production efficiency can be achieved by the melt-kneading method. Namely, a method wherein the thermoplastic resin in the form of a powder or pellets is mixed with the fine inorganic or organic powder and a hydrophilizing agent are mixed in a Henschel mixer, a ribbon blender, a super mixer or the like, then kneaded in a molten state using a single- or twin-screw kneader, extruded as strands and then cut into pellets, or another method wherein the mixture is extruded into water from a strand die and then cut with the rotary cutting blade provided at the die tip may be used. It is also possible to mix a hydrophilizing agent in the form of a powder, a liquid or a solution in water or an organic solvent with the thermoplastic resin or the fine inorganic or organic powder and then further mixing with other components. Concerning the single- or twin-screw kneader to be used herein, the L/D (length/diameter) ratio, shear rate, specific energy, retention time, temperature, etc. may be appropriately determined depending on the properties of the components employed.

The thickness of porous resin film according to the present invention is not particularly restricted. For example, the thickness may be adjusted to 10 to 400 µm, preferably 30 to 100 µm.

The porous resin film according to the present invention may be used as such. Alternatively, it may be laminated onto another thermoplastic film, laminate paper, pulp paper, nonwoven fabric, fabric, etc. The thermoplastic film on which the porous resin film is to be laminated, a transparent or opaque film such as a polyester film, a polyamide film or a polyolefin film may be used. In particular, a recording medium can be obtained by forming an appropriate functional layer as will be described in Example hereinafter.

For example, a recording medium can be constructed by laminating the porous resin film according to the present invention as a surface layer on a base material layer made of a thermoplastic film. A recording medium having the porous resin film according to the present invention as the surface layer is particularly useful as a recording medium for ink jet recording. As the example of the base material layer, a film containing a polypropylene-based resin and a fine inorganic powder may be cited, though the present invention is not restricted thereto.

The total thickness of the recording medium thus constructed by laminating the porous resin film according to the present invention on another film may be adjusted to, for example, about 50 µm to 1 mm.

Combining various methods well known by those skilled in the art can produce the porous resin film according to the present invention. Any porous resin films or recording media fall within the scope of the present invention regardless of production methods, so long as porous resin films satisfying the requirements of the present invention are used therein.

As a method of producing the porous resin film according to the present invention having a liquid absorption capacity of 0.5 ml/m$^2$ or above, various publicly known film production techniques and combinations thereof can be used. Examples thereof include the oriented film method taking advantage of the formation of pores by orientation, the rolling method wherein pores are formed in the course of rolling, the calender molding method, the foaming method using a foaming agent, a method using pore-containing particles, the solvent extraction method and a method wherein mixed components are dissolved and extracted. Among these methods, the oriented film method is favorable.

In the orientation, it is not always necessary to orientate the porous resin film according to the present invention alone. When it is intended to finally produce a recording medium having the porous resin film according to the present invention provided on a base material layer, for example, the unorientated porous resin film may be laminated on the base material layer and then the composite laminate may be orientated. Compared with the method where individual layers are laminated separately, the above method wherein a laminate is preliminarily formed followed by orientation can be conveniently and less expensively performed. In this case, moreover, the pores formed in the porous resin film according to the present invention and the base material layer can be more easily controlled. When using as a recording medium, in particular, it is favorable that the pore formation is controlled so that a larger number of pores are formed in the porous resin film according to the present invention than in the base material layer. Thus, the porous resin film can effectively act as a layer for improving ink absorption properties.

Orientation can be performed by using various publicly known methods. When using an amorphous resin, the orientation can be performed at the glass transition temperature of the thermoplastic resin employed or higher. When a crystalline resin, the orientation can be performed at a temperature adequate for the thermoplastic resin within a range from the glass transition temperature of the amorphous part to the melting point of the crystalline part. More specifically speaking, the orientation can be performed by longitudinal orientation using the difference in circumferential speed between rolls, lateral orientation using a tenter oven, rolling, inflation orientation using tube-shaped film and a mandrel, simultaneous biaxial orientation using a tenter oven combined with a linear motor, etc.

The orientation ratio is not particularly restricted but appropriately determined by taking the purpose of using the porous resin film according to the present invention, the characteristics of the thermoplastic resin employed, etc. into consideration. When using a propylene homopolymer or a copolymer thereof as the non-hydrophilic thermoplastic resin, the orientation ratio in a single direction ranges from about 1.2 to 12, preferably from 2 to 10, and the area ratio in biaxial orientation ranges from 1.5 to 60, preferably 10 to 50. When using another thermoplastic resin, the orientation ratio in a single direction ranges from about 1.2 to 10, preferably from 2 to 7, and the area ratio in biaxial orientation ranges from 1.5 to 20, preferably 4 to 12.

If necessary, heat treatment can be further performed at a high temperature. The orientation is carried out at a temperature lower by 2 to 160° C. than the melting point of the non-hydrophilic thermoplastic resin employed. When using a propylene homopolymer or a copolymer thereof as the non-hydrophilic thermoplastic resin, it is preferable that the orientation temperature is lower by 2 to 60° C. than the melting point thereof. The orientation speed preferably ranges from 20 to 350 m/min.

The orientated thermoplastic resin film according to the present invention may be used as such. Alternatively, it may be laminated at least on one face of another base material (A) and thus employed as a laminate. Examples of the base material (A) include transparent or opaque films such as a polyester film, a polyamide film and a polyolefin film, a plastic board, pulp paper, nonwoven fabric, fabric, a wood plate and a metal plate.

In case where the base material (A) in the laminate is a resin film, the resin and fine inorganic or organic powder to be used may be one selected from the above-described non-hydrophilic thermoplastic resins or a combination of two or more thereof. Also, a mixture of a non-hydrophilic thermoplastic resin with a hydrophilic thermoplastic resin may be used. Moreover, use may be made of the same resin as the one used in the porous resin film. A resin having been orientated may be employed.

When using a mixture of a non-hydrophilic thermoplastic resin with a hydrophilic thermoplastic resin as the base material (A), it is preferable to use from 10 to 100 parts by weight of the hydrophilic thermoplastic resin per 100 parts by weight of the non-hydrophilic thermoplastic resin.

The base material (A) contains, for example, from 40 to 85% by weight of a thermoplastic resin and from 15 to 60% by weight of a fine inorganic or organic powder.

The fine powder to be used in the base material (A) may be either the same as the one used in the porous resin film or different therefrom. The average particle diameter thereof in the base material (A) ranges, for example, from 0.1 to 10 µm, preferably from 0.6 to 3 µm.

The thickness of the base material (A) to be used in the laminate according to the present invention is not particularly restricted. For example, the thickness ranges from 5 to 1000 µm, preferably from 20 to 500 µm.

The thickness of the laminate according to the present invention is not particularly restricted. For example, the thickness ranges from 15 to 2000 µm, preferably from 20 to 500 µm and more preferably from 25 to 350 µm.

(Surface Oxidation Treatment)

The porous resin film according to the present invention or the laminate using the same may be subjected to a surface oxidation treatment, if necessary. The surface oxidation treatment sometimes contributes to the improvement in the surface hydrophilicity and absorption properties or improvement in the application properties of the ink-receiving layer or the adhesiveness to the porous resin film. Specific examples of the surface oxidation treatment include the corona discharge treatment, the flame treatment, the plasma treatment, the glow discharge treatment and the ozone treatment. Among all, the corona treatment and the flame treatment are preferable and the corona treatment is more preferable.

In case of the corona treatment, the treatment dose ranges from 600 to 12,000 J/m$^2$ (10 to 200 W min/m$^2$), preferably from 1,200 to 9,000 J/m$^2$ (20 to 150 W min/m$^2$). To achieve the sufficient effect of the corona discharge treatment, the dose should be 600 J/m$^2$ (10 W min/m$^2$) or above. Since the effect of the treatment cannot be elevated any more at a dose exceeding 12,000 J/m$^2$ (200 W min/m$^2$), it is enough that the dose is not more than 12,000 J/m$^2$ (200 W min/m$^2$). In case of the flame treatment, the treatment dose ranges from 8,000 to 200,000 J/m$^2$, preferably from 20,000 to 100,000 J/m$^2$. To achieve the apparent effect of the flame discharge treatment, the dose should be 8,000 J/m$^2$ or above. Since the effect of the treatment cannot be elevated any more at a dose exceeding 200,000 J/m$^2$, it is enough that the dose is not more than 200,000 J/m$^2$.

[Ink-Receiving Layer]

In the present invention, an ink-receiving layer having a surface glossiness (JIS-Z8741: measuring method at 60°) of 40% or above is provided so as to achieve a high glossiness in addition to favorable ink absorption properties.

<Inorganic Filler>

In order to achieve a high glossiness and favorable ink absorption properties, the ink-receiving layer contains from 70 to 95% by weight of an inorganic filler having an average particle diameter of 350 nm or below and from 5 to 30% by weight of a binder resin.

It is undesirable to use an inorganic filler having an average particle diameter exceeding 350 nm, since the surface glossiness of the thus obtained ink-receiving layer is significantly decreased.

Examples of the inorganic filler to be used in the present invention include spherical colloidal silica, spherical colloidal calcium carbonate, amorphous silica, pearl necklace-type colloidal silica, alumina and alumina hydrate.

Among the above-described inorganic fillers, alumina or alumina hydrate are preferred, since particles of these compounds are positively charged on the surface and thus exhibit favorable fixation properties to an ink jet ink which is charged negatively.

Specific examples of the alumina include α-alumina, β-alumina, γ-alumina, δ-alumina, η-alumina and θ-alumina. Based on ink absorption properties and glossiness, δ-alumina is preferable therefor.

Specific examples of the alumina hydrate include an alumina hydrate showing a pseudoboehmite structure (pseudoboehmite) and an alumina hydrate showing an amorphous structure (amorphous alumina hydrate). Based on ink absorption properties and glossiness, pseudoboehmite is preferable therefor.

Among the above-described inorganic fillers, it is preferable to use amorphous silica since it is excellent in ink jet ink absorption properties and less expensive. In order to obtain a highly gloss ink-receiving layer, it is particularly preferable to use amorphous silica made up of primary particles having an average particle diameter of 1 to 10 nm aggregating together.

Amorphous silica has a structure wherein primary particles having an average particle diameter of 1 to 50 nm aggregate together. It is preferable to use amorphous silica having a primary particle diameter of 1 to 10 nm, thereby improving the ink absorption properties.

It is undesirable to use amorphous silica having a primary particle diameter of 10 nm or above in the ink-receiving layer, since the glossiness and ink absorption properties are significantly decreased. Although the reason why the amorphous silica falling within the scope of the present invention exerts favorable performance still remains unclear, it is assumed that the amorphous silica having a primary particle diameter of 1 to 10 nm would contribute to the improvement in ink absorption properties owing to the increased gaps among primary particles, in addition to the high glossiness.

Methods of producing amorphous silica are roughly classified into the dry method and the wet method. Silica produced by any method is usable in the present invention, so long as it is amorphous silica having a primary particle diameter of 1 to 10 nm and an average particle diameter of 350 nm or below.

It is also possible in the present invention to use amorphous silica that is obtained by milling marketed amorphous silica having an average particle diameter of 2 to 10 $\mu$m to give an average particle diameter of 350 nm or below. Although the amorphous silica may be milled by an arbitrary method without restriction, it is preferable to use a mechanical milling method using a mill from the viewpoints that milling can be effected at a low cost thereby and the thus obtained product has uniform qualities. Specific examples of the mill include an ultrasonic mill, a jet mill, a sand grinder, a roller mill and a high-speed rotary mill.

To improve the fixation properties of an ink jet ink having an anionic nature, it is preferable that the amorphous silica to be used in the present invention is subjected to a cation treatment.

The term "cation treatment" means a treatment whereby the surface of the silica is coated with a cationic agent in the course of milling or producing the silica. Examples of the cationic agent include inorganic metal salts, cationic coupling agents and cationic polymers.

Specific examples of the inorganic metal salts include inorganic metal oxide hydrates such as aluminum oxide hydrate, zirconium oxide hydrate and tin oxide hydrate; and water-soluble inorganic metal salts, such as aluminum hydroxide, aluminum sulfate, aluminum chloride, aluminum acetate, aluminum nitrate, zirconium sulfate, zirconium chloride and tin chloride.

Specific examples of the cationic coupling agents include cationic silane coupling agents, such as amino group-containing silane coupling agents and quaternary ammonium group-containing silane coupling agents; cationic zirconium coupling agents, such as amino group-containing zirconium coupling agents and quaternary ammonium group-containing zirconium coupling agents; cationic titanium coupling agents, such as amino group-containing titanium coupling agents and quaternary ammonium group-containing titanium coupling agents; and cationic glycidyl coupling agents, such as amino group-containing glycidyl ethers and quaternary ammonium group-containing glycidyl ethers.

Specific examples of the cationic polymers include polyalkylene polyamines, such as polyethylene imine and polypropylene polyamine and derivatives thereof; acrylic polymers containing amino group or quaternary ammonium group; and polyvinyl alcohols containing amino group or quaternary ammonium group.

The average particle diameter and primary particle diameter of the inorganic filler to be used in the ink-receiving layer in the present invention can be measured by using the same apparatus as used in the measurement of the particle diameter of the fine inorganic or organic powder of the porous resin film as described above.

In the ink-receiving layer according to the present invention, a binder resin is used as an adhesive in addition to the inorganic filler. It is preferable that the inorganic filler to the binder resin are used at the composition ratio of from 70 to 95% by weight of the inorganic filler and from 5 to 30% by weight of the binder resin.

In case where the content of the inorganic filler exceeds 95% by weight, the adhesiveness to the porous resin film is seriously worsened. In case where the content is less than 70% by weight, the ink absorption properties are seriously worsened.

Specific examples of the binder resin include water-soluble resins such, as polyvinyl alcohol and its derivatives; polyvinylpyrrolidone; polyacrylamide; hydroxyethylcellulose; casein; and starch; and water-insoluble resins, such as urethane-based resins, ester-based resins, epoxy-based resins, ethylene-based resins, ethylene-vinyl acetate copolymer resins, vinyl acetate-based resins, vinyl chloride-based resins, vinyl chloride-vinyl acetate copolymer resins, vinylidene chloride-based resins, vinyl chloride-vinylidene chloride copolymer resins, acrylic acid-based resins, methacrylic acid-based resins, polybutyral-based resins, silicone resins, nitrocellulose resins, styrene-acrylic copolymer resins, styrene-butadiene-based copolymer resins and acrylonitirle-butadiene copolymer resins. The water-soluble resins as cited above may be used in the form of an aqueous solution, while the water-insoluble resins may be used in the form of a solution, an emulsion or a latex.

Among the above-described binders, polyvinyl alcohol is preferable based on miscibility with the inorganic filler and ink absorption properties. In particular, it is preferable to use a polyvinyl alcohol having a degree of polymerization of 2,000 or above, preferably 3,000 or above, and a degree of saponification of 80 to 100%, preferably 80 to 95%, based on coating film strength.

To improve the water resistance of the binder resin in the present invention, a crosslinking agent in an amount of from 1 to 20% by weight in the ink-receiving layer can be used. Specific examples of the crosslinking agent include urea-formaldehyde resins, melamine-formaldehyde resins, polyamide polyurea-formaldehyde resins, glyoxal, epoxy-based crosslinking agents, polyisocyanate resins, boric acid, borax and various boric acid salts.

Moreover, it is preferable in the present invention to use an ink fixer in an amount of from 1 to 20% by weight in the ink-receiving layer to thereby improve the ink fixation properties. Examples of the ink fixer include inorganic metal salts, cationic coupling agents and cationic polymers.

Specific examples of the inorganic metal salts include inorganic metal oxide hydrates such as aluminum oxide hydrate, zirconium oxide hydrate and tin oxide hydrate; and water-soluble inorganic metal salts such as aluminum hydroxide, aluminum sulfate, aluminum chloride, aluminum acetate, aluminum nitrate, zirconium sulfate, zirconium chloride and tin chloride.

Specific examples of the cationic coupling agents include cationic silane coupling agents, such as amino group-containing silane coupling agents and quaternary ammonium group-containing silane coupling agents; cationic zirconium coupling agents, such as amino group-containing zirconium coupling agents and quaternary ammonium group-containing zirconium coupling agents; cationic titanium coupling agents, such as amino group-containing titanium coupling agents and quaternary ammonium group-containing titanium coupling agents; and cationic glycidyl coupling agents, such as amino group-containing glycidyl ethers and quaternary ammonium group-containing glycidyl ethers.

Specific examples of the cationic polymers include polyalkylene polyamines, such as polyethylene imine and polypropylene polyamine and derivatives thereof, acrylic polymers containing amino group or quaternary ammonium group and polyvinyl alcohols containing amino group or quaternary ammonium group.

The ink-receiving layer according to the present invention may also contain various auxiliary agents generally employed in coated paper such as a dispersant, a thickener, a defoaming agent, a preservative, an UV absorber, an antioxidant and a surfactant, if necessary.

The coating dose of the ink-receiving layer according to the present invention may be appropriately selected depending on the liquid absorption capacity of the porous resin film employed as the substrate. The coating dose preferably ranges from 5 to 30 g/m$^2$. When the coating dose is less than 5 g/m$^2$, only insufficient glossiness, bleeding properties and water resistance can be obtained. In case where the coating dose exceeds 30 g/m$^2$, a satisfactory ink absorption can be obtained but the surface strength of the ink-receiving layer is worsened.

[Top Coat Layer]

In order to improve the glossiness and surface scratch-proof properties, it is preferable in the present invention to further provide a top coat layer having a surface glossiness (JIS-Z8741: measuring method at 60°) of 50% or above on the ink-receiving layer.

The top coat layer according to the present invention preferably contains from 70 to 95% by weight of an inorganic filler having an average particle diameter of 350 nm or below and from 5 to 30% by weight of a binder resin. As the inorganic filler and the binder resin, inorganic fillers and binders of the same types as used in the ink-receiving layer can be used.

To improve the ink fixation properties, it is preferable that the top coat layer contains from 1 to 20% by weight of a cationic ink fixer. As the ink fixer, ink fixers of the same type as used in the ink-receiving layer as described above can be used.

The coating dose of the top coat layer may be appropriately determined depending on the types of the ink-receiving layer and the porous resin film. It ranges from 0.1 to 5.0 g/m$^2$, preferably from 0.5 to 3.0 g/m$^2$. When the coating dose is less than 0.1 g/m$^2$, the effects of the top coat layer cannot be sufficiently achieved. Even though the coating dose exceeds 5.0 g/m$^2$, the effects cannot be improved any more.

The top coat layer according to the present invention may further contain various auxiliary agents generally employed in coated paper such as a dispersant, a thickener, a defoaming agent, a preservative, an UV absorber, an antioxidant and a surfactant, if necessary.

<Coating Method>

The above-described ink-receiving layer and top coat layer can be applied on the porous resin film by a method appropriately selected form among publicly known methods. Examples of the coating method include the blade coating method, the rod bar coating method, the roll coating method, the air knife coating method, the spray coating method, the gravure coating method, the curtain coating method, the die coating method and the comma coating method.

<Other Recording Methods>

In addition to the use as recording paper for ink jet printers, the ink jet recording paper according to the present invention is usable as recording paper for melt type thermal transfer printers, sublimation type thermal transfer printers and page printers.

EXAMPLES

Now, the present invention will be illustrated in greater detail by reference to the following Production Examples, Examples, Comparative Examples and Test Examples. The materials, amounts, ratios, operations, etc. given in these examples can be optionally altered without departing from the spirit of the present invention. Namely, the scope of the present invention is not restricted to the examples. Unless otherwise noted, the percentages given in these examples are all by weight. Table 1 summarizes the materials employed. Recording media having the porous resin films according to the present invention and comparative resin films were produced in accordance with the following procedure.

PRODUCTION EXAMPLES

Now, methods of producing the porous resin films (substrates a to e) will be illustrated.

Production Example 1

<Preparation of Base Material Layer and Longitudinal Orientation>

A composition (a) prepared by adding 20% by weight of calcium carbonate having an average particle diameter of 3 µm to a mixture of 75% by weight of polypropylene having a melt flow rate (MFR: 230° C., 2.16 kg load) of 1 g/10 min with 5% by weight of high-density polyethylene having a melt flow rate (MFR: 190° C., 2.16 kg load) of 8 g/10 min was kneaded in an extruder controlled at a temperature of 250° C., extruded in strands and then cut to give pellets. This composition (a) was extruded in a sheet from a T-die connected to the extruder controlled at 250° C. and then cooled with a cooling apparatus. Thus an unorientated sheet was obtained. Next, this unorientated sheet was heated to 140° C. and orientated 5-fold longitudinally to give an orientated sheet.

In the operation of melt-kneading resin components optionally mixed with a fine powder in each example, the sum of the amounts of the resin components and the fine powder was referred to as 100 parts by weight and 0.2 part by weight of BHT (4-methyl-2,6-di-t-butylphenol) and 0.1 part by weight of IRGANOX 1010 (a phenol-based antioxidant manufactured by Ciba-Geigy) were added thereto as antioxidants.

<Formation of Porous Resin Film on Surface>

Separately, a mixture of 30% by weight of polypropylene (abbreviation: PP1) having MFR of 5 g/10 min and 12% by weight of a polyalkylene oxide-based resin (an ester of a copolymer of about 90% of ethylene oxide and about 10% of butylene oxide having an average molecular weight of about 20,000 and octadecamethylenedicarboxylic acid having an average molecular weight as a whole of about 114,000 and a water absorption ratio of 14 g/g in 30 minutes, abbreviation: PEPO1) was blended with 58% by weight of calcium carbonate having an average particle diameter of 3 µm, a specific surface area determined by the BET method of 1.8 m$^2$/g and an oil absorption determined in accordance with JIS-K5101-1991 of 31 ml/100 g (abbreviation: CaCO$_3$1) and treated in a twin-screw kneader to give a composition (b).

This composition was extruded with an extruder set to 240° C. (temperature a). The thus obtained sheet was laminated on the 5-fold orientated sheet prepared by the above-described procedure and cooled to 55° C. (temperature b). Then it was heated to 155° C. (temperature c) and orientated 8-fold laterally using a tenter over. Next, it was annealed at 156° C. (temperature d) and cooled to 50° C. (temperature e). After slitting selvages, a porous resin film with a three-layered structure (absorption layer (b) in the front side/base material layer (a)/absorption layer (b) in the back side: thickness 72 µm/40 µm/23 µm) having a total thickness of 135 µm was obtained. This film was referred to as a substrate a. Table 1 also shows the composition and production conditions and the results of the evaluation as a substrate.

The particle diameters of the calcium carbonate powders employed in Examples herein are 50% cumulative particle diameters measured by using a laser diffraction particle size measurement apparatus Microtrack™ (manufactured by K.K. Nikkiso).

The performance of the porous resin film was evaluated by the following methods. Table 1 summarizes the results of the performance evaluation.

<Performance Evaluation>

(1) Liquid Absorption Capacity

The liquid absorption capacity of a porous resin film was determined by measuring the liquid absorption capacity using a liquid absorption capacity test machine manufactured by Kumagai Riki Kogyo K.K. in accordance with "Japan TAPPI No. 51-87" (Japan Technical Association of Pulp and Paper Industry, Pulp and Paper Test Method No. 51-87, Bristow's method). As the measuring solvent, a solvent mixture (100% by weight) comprising 70% by weight of water and 30% by weight of ethylene glycol in which 2 parts by weight of malacite green per 100 parts by weight of this solvent mixture was dissolved as a coloring dye was used.

(2) Average Contact Angle of Porous Resin Film to Water and Difference Between the Maximum and Minimum Values Thereof The water contact angle of the above-described porous resin film was measured with a contact angle meter (Model CA-D, manufactured by Kyowa Kaimen Kagaku K.K.) one minute after dropping pure water on the film surface. The measurement was repeated 10 times (after the completion of each measurement procedure, the used film was replaced by a fresh film having a dry surface). Then the average of the data thus obtained and the difference between the maximum and minimum angles was determined.

(3) Confirmation of the Presence of Surface Pores and Measurement of Surface Pore Number and Surface Pore Size A part of the porous resin film was cut and it was confirmed that the cut piece had pores on the surface and the section. An arbitrary part of a porous resin film sample was sliced and bonded on a sample table. Then the face to be observed was metallized and then observed under a scanning electron microscope (Model S-2400 manufactured by Hitachi) at 500× magnification. Thus, the presence of surface pores was confirmed. The electron microscope image was output on thermal recording paper or photographed and the surface pores were counted. As a result, about $1.2 \times 10^9$ pores were observed per m$^2$. Next, the size of each surface pore was measured and the average of 50 pores observed in the microscopic field was determined. As a result, the major diameter was 15.1 µm while the minor diameter was 4.9 µm.

The average diameter was about 10 μm. When a couple of pores were located in both sides (either horizontally or vertically) of a fine powder particle and connected to each other, these pores were considered as a single open pore.

(4) Confirmation of the Presence of Internal Pores and Measurement of Internal Porosity The above-described porous resin film was embedded in an epoxy resin and solidified. Then, it was sliced in the direction parallel to the thickness direction and orthogonal to the plane direction using a microtome. Then this sectional slice was metallized and observed under a scanning electron microscope (Model S-2400 manufactured by Hitachi) at 2000× magnification. Thus, the presence of internal pores was confirmed. The electron microscopic image in the observed region was output on thermal recording paper and the thickness of each layer was measured. Also, the whole thickness and the basis weight (g/m$^2$) were measured. Next, the absorption layer on the surface was stripped in a definite area and the basis weight and thickness of the remaining film were measured. Based on the differences, the thickness and basis weight (g/m$^2$) of the porous resin film were determined. Thus, the density ($\rho_1$) of the absorption layer was calculated by dividing the basis weight by the thickness. Subsequently, a press sheet (thickness: 1 mm) of the composition (b) was produced at 230° C. and its density ($\rho_0$) was determined. Thus, the porosity was calculated in accordance with the following formula.

$$\text{Porosity} = \frac{\rho_0 - \rho_1}{\rho_0} \times 100$$

$\rho_0$: true density of the thermoplastic resin film; and
$\rho_1$: density of the thermoplastic resin film.

(5) Suitability in Ink Jet Printer

By printing under the following conditions, suitabilities for a dye ink and a pigment ink were evaluated.

| | |
|---|---|
| Printer (1): | EPSON PM-770C (dye ink) |
| Printer (2): | GRAPHTEC JP-2115 (pigment ink) |
| Print sample: | Japan Standards Association SCID color chart sample "S7" A4 (6.6 × 14.3 cm) |
| Setting: | recommended setting, no color correction with driver |
| Environment: | Windows 95 Pentium II 300 MHz, RAM 128MB Parallel I/F |
| Software: | Adobe Photoshop 4.0J |

(Ink absorption properties)

After the completion of printing, the time until the complete disappearance of the ink from the printed part judged with the naked eye was referred to as the drying time. Drying time was evaluated in the following four scores.

⊚: Drying time of 0 minute (completely absorbing the ink at the end of the printing).
○: Drying time of from 0 to 1 minute.
Δ: Drying time of from 1 to 3 minutes.
X: Drying time of 3 minutes or longer.

(Ink Bleeding Properties)

In each of the print samples used in the above ink absorption test, ink bleeding was evaluated with the naked eye in accordance with the following criteria.

○: Suffering from no bleeding.
Δ: Suffering from bleeding only in color-overlapped parts.
X: Suffering from bleeding both in color-overlapped and monochromatic parts.

(Water Resistance)

Samples printed under the same conditions as in the above-described ink absorption test were each soaked in a sufficient amount of tap water (water temperature 25° C.) for 4 hours and then the paper face was air-dried. The extent of residual ink was evaluated with the naked eye.

| | |
|---|---|
| Ink residual ratio: 100 to 80% | ○ |
| Ink residual ratio: 80 to 50% | Δ |
| Ink residual ratio: 50 to 0% | X |

Production Example 2

A porous resin film was obtained as in Production Example 1, with the following changes: the polyalkylene oxide in Production Example 1 was substituted with a polyalkylene oxide-based resin which was an ester of a copolymer of about 85% of ethylene oxide and about 15% of butylene oxide having an average molecular weight of about 20,000 and tetradecamethylenedicarboxylic acid having an average molecular weight as a whole of about 118,000 and a water absorption ratio of about 13 g/g in 30 minutes (abbreviation: PEPO2) and the composition ratios of the polypropylene, polyalkylene oxide copolymer and calcium carbonate were altered, and the temperatures a to e respectively as listed in Table 1 were used. This film was referred to as a substrate b. Table 1 summarizes the composition and production conditions and the results of the evaluation.

Production Example 3

A porous resin film was obtained as in Production Example 1, with the following changes: a fine powder of calcium carbonate having an average particle diameter of 2 μm (specific surface area: 2.2 m$^2$/g, oil absorption measured in accordance with JIS-K5101-1991: 35 ml/100 g, abbreviation: CaCO$_3$2) was used and the composition ratios as listed in Table 1 were employed. This film was referred to as a substrate c. Table 1 summarizes the composition and production conditions and the results of the evaluation.

Production Example 4

A porous resin film was obtained as in Production Example 1, with the following changes: 40% by weight of the non-hydrophilic thermoplastic resin (PP-1), 60% by weight of the CaCO$_3$1 was used as the fine powder and no hydrophilic resin was added. This film was referred to as a substrate d. Table 1 summarizes the composition and production conditions and the results of the evaluation.

Production Example 5

A porous resin film was obtained as in Production Example 1, with the following changes: 30% by weight of the hydrophilic thermoplastic resin (PEPO1) and 70% by weight of the non-hydrophilic thermoplastic resin (PP-1) as the resin components were used, no fine powder was added and the orientation procedure with a tenter was omitted. This film was referred to as a substrate e. Table 1 summarizes the composition and production conditions and the results of the evaluation.

Examples 1 to 9, Comparative Examples 1, 2 and 4 to 7

Ink jet recording sheets were produced in the following manner by using the materials listed in Table 2 respectively in the specified amounts.

Amorphous silica, a binder resin, a crosslinking agent, an ink fixer and water were mixed together to prepare a coating solution for forming an ink-receiving layer. This coating solution was applied on the front face of a porous resin film with a Mayer bar in such a manner as to give a coating dose of 15 g/m² after drying. Then it was solidified by drying in an oven at 110° C. for 5 minutes to form an ink-receiving layer, thereby giving an ink jet recording paper. The suitability for ink jet printer of this ink jet recording paper was evaluated by the same method as employed in the case of the porous resin film.

Table 3 shows the composition, surface glossiness and results of the evaluation of ink jet suitability.

Examples 10 to 12

Ink jet recording sheets were produced in the following manner by using the materials listed in Table 2 respectively in the specified amounts.

An inorganic filler, a binder resin, an ink fixer and water were mixed together to prepare a coating solution for forming a top coat layer.

After forming an ink-receiving layer on a porous resin film as in Example 5, this coating solution for top coat layer was applied thereon with a Mayer bar in such a manner as to give a coating dose of 1.0 g/m² after drying. Then it was solidified by drying in an oven at 110° C. for 1 minute to form a top coat layer, thereby giving an ink jet recording paper. Table 3 shows the composition, surface glossiness and results of the evaluation of ink jet printer suitability.

Comparative Example 3

An ink jet recording paper was produced as in Comparative Example 1, but with an alteration of the coating dose of the ink-receiving layer to 25 g/m². Table 3 shows the composition, surface glossiness and results of the evaluation of ink jet printer suitability.

TABLE 1

|  | Production Example | | | | |
| --- | --- | --- | --- | --- | --- |
|  | 1 | 2 | 3 | 4 | 5 |
| Substrate | a | b | c | d | e |
| Component | | | | | |
| <Hydrophilic resin> | | | | | |
| Type | PEPO1 | PEPO2 | PEPO1 | — | PEPO1 |
| Absorption ratio (g/g) | 14 | 13 | 14 | — | 14 |
| Content (wt. %/wt. part) | 12/43 | 12/35 | 12/35 | — | 30/43 |
| <Non-hydrophilic thermoplastic resin> | | | | | |
| Type | PP1 | PP1 | PP1 | PP1 | PP1 |
| Content (wt. %/wt. part) | 30/100 | 34/100 | 34/100 | 40/100 | 70/100 |
| <Fine powder> | | | | | |
| Type | $CaCO_3$1 | $CaCO_3$1 | $CaCO_3$2 | $CaCO_3$1 | — |
| Av. particle diameter (μm) | 3 | 3 | 2 | 3 | — |
| Specific surface area (m²/g) | 1.8 | 1.8 | 2.2 | 1.8 | — |
| Content (wt. %) | 58 | 54 | 54 | 60 | — |
| <Dispersion improver> | | | | | |
| Type | — | — | P-1 | — | — |
| Content (wt. part) | — | — | 0.5 | — | — |
| Production conditions | | | | | |
| Temperature a (° C.) | 240 | 240 | 240 | 240 | 240 |
| Temperature b (° C.) | 55 | 55 | 55 | 55 | 50 |
| Temperature c (° C.) | 155 | 154 | 154 | 155 | — |
| Temperature d (° C.) | 156 | 155 | 155 | 155 | — |
| Temperature e (° C.) | 50 | 50 | 50 | 50 | — |
| Film evaluation results | | | | | |
| Total film thickness (μm) | 135 | 137 | 165 | 146 | 356 |
| Porous resin film layer thickness (μm) | 72 | 70 | 82 | 65 | 70 |
| Base layer thickness (μm) | 40 | 32 | 40 | 40 | 255 |
| Liquid absorption capacity (2 sec) (ml/m²) | 7.5 | 7.3 | 8.4 | 0 | 0 |
| Surface glossiness (%) | 25 | 26 | 24 | 17 | 90 |
| Average surface contact angle to water (°) | 90 | 75 | 72 | 115 | 33 |
| Difference between maximum and minimum contact angles (°) | 7 | 8 | 4 | 3 | 5 |
| Internal porosity (%) | 61 | 57 | 58 | 50 | 0 |
| Surface pore count (pores/m²) | 1.2E+9 | 9.7E+8 | 1/7E+9 | 2.2E+10 | 0 |
| Average surface pore diameter (μm) | 10 | 12 | 7 | 5 | 0 |

TABLE 1-continued

| | Production Example | | | | |
|---|---|---|---|---|---|
| | 1 | 2 | 3 | 4 | 5 |
| Substrate | a | b | c | d | e |
| Dye ink | | | | | |
| Ink absorption (naked eye) | ○ | ○ | ○ | X | X |
| Bleeding (naked eye) | Δ | Δ | Δ | X | X |
| Water resistance (naked eye) | X | X | X | X | X |
| Pigment ink | | | | | |
| Ink absorption (naked eye) | ○ | ○ | ○ | X | X |
| Bleeding (naked eye) | Δ | Δ | Δ | X | X |
| Water resistance (naked eye) | Δ | Δ | Δ | X | X |

TABLE 2

| Material | Description |
|---|---|
| Amorphous silica 1 | Aqueous dispersion (solid content 20%) of fine silica particles having primary particle diameter of 7 nm and average particle diameter of 300 nm obtained by milling silica "Silojet 703 A ™" (manufactured by Grace Japan, produced by the gel method) |
| Amorphous silica 2 | Aqueous dispersion (solid content 10%) of fine silica particles having primary particle diameter of 6 nm and average particle diameter of 300 nm obtained by dispersing "Mizukasil P-73 ™" (manufactured by Mizusawa Industrial Chemicals, Ltd., produced by the gel method and having average particle diameter 2.5 μm) with sand grinder |
| Amorphous silica 3 | Aqueous dispersion (solid content 18%) of cation-treated fine silica particles having primary particle diameter of 7 nm and average particle diameter of 300 nm obtained by milling silica "Silojet 703C ™" (manufactured by Grace Japan, produced by the gel method) |
| Amorphous silica 4 | Aqueous dispersion (solid content 8%) of fine silica having primary particle diameter of 7 nm and average particle diameter of 100 nm obtained by dispersing "Aerosil 300CF ™" (manufactured by Nippon Aerosil, produced by the gas phase method) with sand grinder |
| Amorphous silica 5 | Aqueous dispersion (solid content 10%) of fine silica particles having primary particle diameter of 6 nm and average particle diameter of 800 nm obtained by dispersing "Mizukasil P-73 ™" (manufactured by Mizusawa Industrial Chemicals, Ltd., produced by the gel method and having average particle diameter 2.5 μm) with sand grinder |
| Amorphous silica 6 | Aqueous dispersion (solid content 10%) of fine silica particles having primary particle diameter of 25 nm and average particle diameter of 300 nm obtained by dispersing "Mizukasil P-526 ™" (manufactured by Mizusawa Industrial Chemicals, Ltd., produced by the sedimentation method and having average particle diameter 3.0 μm) with sand grinder |
| Colloidal silica 1 | Aqueous dispersion (solid content 40%) of spherical colloidal silica "Snowtex YL ™" (manufactured by Nissan Chemical Industries, Ltd., having average particle diameter of 75 nm) |
| Binder resin | Aqueous solution (solid content 10%) of "Kuraray Poval PVA-235 ™" (manufactured by Kuraray, polyvinyl alcohol having degree of polymerization of 3500 and degree of saponification of 88%) |
| Crosslinking agent 1 | Aqueous dispersion (solid content 80%) of "U-Ramin P-6300 ™" (manufactured by Mitsui Chemicals, melamine-formali resin) |
| Crosslinking agent 2 | Aqueous dispersion (solid content 4%) of sodium tetraborate decahydrate (borax, reagent manufactured by Wako Pure Chemical Industries) |
| Ink fixer 1 | Aqueous dispersion (solid content 30%) of "Sumirez Resin 1001 ™" (manufactured by Sumitomo Chemical, cationic acrylic polymer) |
| Ink fixer 2 | 10% aqueous dispersion of aluminum chloride hexahydrate (reagent manufactured by Wako Pure Chemical Industries) |

TABLE 3

| | Example | | | | | | | | | | | | Comparative Example | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 | 6 | 7 |
| Substrate | a | a | a | a | a | a | a | b | c | a | a | a | d | e | d | a | a | a | a |
| Ink-receiving layer | | | | | | | | | | | | | | | | | | | |
| Amorphous silica 1 | 80 | | | | 76 | 76 | | 76 | 76 | 76 | 76 | 76 | 80 | 80 | 80 | | | 60 | 97 |
| Amorphous silica 2 | | 80 | | | | | | | | | | | | | | | | | |
| Amorphous silica 3 (cation) | | | 80 | | | | | | | | | | | | | | | | |
| Amorphous silica 4 | | | | 80 | | | 76 | | | | | | | | | | | | |
| Amorphous silica 5 | | | | | | | | | | | | | | | | 80 | | | |
| Amorphous silica 6 | | | | | | | | | | | | | | | | | 80 | | |

TABLE 3-continued

|  | Example | | | | | | | | | | | | Comparative Example | | | | | | |
| --- | --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 | 5 | 6 | 7 |
| Binder resin | 20 | 20 | 20 | 20 | 20 | 20 | 20 | 20 | 20 | 20 | 20 | 20 | 20 | 20 | 20 | 20 | 20 | 40 | 3 |
| Crosslinking agent 1 |  |  |  |  | 2 | 2 |  | 2 | 2 | 2 | 2 | 2 |  |  |  |  |  |  |  |
| Crosslinking agent 2 |  |  |  |  |  |  | 2 |  |  |  |  |  |  |  |  |  |  |  |  |
| Ink fixer 1 |  |  |  | 2 |  |  | 2 | 2 | 2 | 2 | 2 | 2 |  |  |  |  |  |  |  |
| Ink fixer 2 |  |  |  |  |  | 2 |  |  |  |  |  |  |  |  |  |  |  |  |  |
| Coating dose (g/m²) | 15 | 15 | 15 | 15 | 15 | 15 | 15 | 15 | 15 | 15 | 15 | 15 | 15 | 15 | 25 | 15 | 15 | 15 | 15 |
| Top coat layer |  |  |  |  |  |  |  |  |  |  |  |  |  |  |  |  |  |  |  |
| Amorphous silica 1 |  |  |  |  |  |  |  |  |  | 90 |  |  |  |  |  |  |  |  |  |
| Colloidal silica 1 |  |  |  |  |  |  |  |  |  |  | 90 | 80 |  |  |  |  |  |  |  |
| Binder resin |  |  |  |  |  |  |  |  |  | 10 | 10 | 10 |  |  |  |  |  |  |  |
| Ink fixer 2 |  |  |  |  |  |  |  |  |  |  |  | 10 |  |  |  |  |  |  |  |
| Film evaluation results |  |  |  |  |  |  |  |  |  |  |  |  |  |  |  |  |  |  |  |
| Surface glossiness (%) | 47 | 45 | 42 | 48 | 45 | 46 | 44 | 47 | 44 | 55 | 59 | 60 | 37 | 55 | 32 | 15 | 18 | 44 | 3 |
| Dye ink |  |  |  |  |  |  |  |  |  |  |  |  |  |  |  |  |  |  |  |
| Ink absorption (naked eye) | ⊚ | ⊚ | ⊚ | ⊚ | ⊚ | ⊚ | ⊚ | ⊚ | ⊚ | ⊚ | ⊚ | ⊚ | Δ | Δ | ⊚ | ⊚ | ○ | Δ | ⊚ |
| Bleeding (naked eye) | ○ | ○ | ○ | ○ | ○ | ○ | ○ | ○ | ○ | ○ | ○ | ○ | ○ | ○ | ○ | ○ | ○ | Δ | X |
| Water resistance (naked eye) | X | X | X | X | ○ | ○ | ○ | ○ | ○ | ○ | ○ | ○ | X | X | X | X | X | X | X |
| Pigment ink |  |  |  |  |  |  |  |  |  |  |  |  |  |  |  |  |  |  |  |
| Ink absorption (naked eye) | ⊚ | ⊚ | ⊚ | ⊚ | ⊚ | ⊚ | ⊚ | ⊚ | ⊚ | ⊚ | ⊚ | ⊚ | Δ | Δ | ⊚ | ⊚ | ○ | Δ | ⊚ |
| Bleeding (naked eye) | ○ | ○ | ○ | ○ | ○ | ○ | ○ | ○ | ○ | ○ | ○ | ○ | ○ | ○ | ○ | ○ | ○ | Δ | X |
| Water resistance (naked eye) | Δ | Δ | ○ | Δ | ○ | ○ | ○ | ○ | ○ | ○ | ○ | ○ | Δ | Δ | Δ | Δ | Δ | Δ | X |

Examples 13 to 18, Comparative Examples 8, 9 and 11 to 13

Ink jet recording sheets were produced in the following manner by using the materials listed in Table 4 respectively in the specified amounts.

Namely, alumina or alumina hydrate was mixed with a binder resin to prepare a coating solution for forming an ink-receiving layer. This coating solution was applied on the front face of a porous resin film with a Mayer bar in such a manner as to give a coating dose of 20 g/m² after drying. Then it was solidified by drying in an oven at 110° C. for 5 minutes to form an ink-receiving layer, thereby giving an ink jet recording paper. The suitability for ink jet printer of this ink jet recording paper was evaluated by the same method as employed in the case of the porous resin film. Table 5 shows the composition, surface glossiness and results of the evaluation of ink jet printer suitability.

Examples 19 and 20

Ink jet recording sheets were produced in the following manner by using the materials listed in Table 4 respectively in the specified amounts.

An ink-receiving layer was formed on a porous resin film as in Example 13. An inorganic filler was mixed with a binder resin to prepare a coating solution for forming a top coat layer. Then, this coating solution for top coat layer was applied on the ink-receiving layer with a Mayer bar in such a manner as to give a coating dose of 1.0 g/m² after drying. Then it was solidified by drying in an oven at 110° C. for 1 minute to form a top coat layer, thereby giving an ink jet recording paper. Table 5 shows the composition, surface glossiness and results of the evaluation of ink jet printer suitability. Table 5 shows the composition, surface glossiness and results of the evaluation of ink jet printer suitability.

Comparative Example 10

An ink jet recording paper was produced as in Comparative Example 1, but with an alteration of the coating dose of the ink-receiving layer to 30 g/m². Table 5 shows the composition, surface glossiness and results of the evaluation of ink jet printer suitability.

TABLE 4

| Material | Description |
| --- | --- |
| Alumina 1 | Dispersion in solvent mixture (water/isopropyl alcohol = 80/20, by weight) obtained by dispersing "Aluminium Oxide C ™" (manufactured by Nippon Aerosil, δ-alumina having average particle diameter of 20 nm) with homogenizer and ultrasonic dispersion machine |
| Alumina 2 | Dispersion in solvent mixture (water/isopropyl alcohol = 80/20, by weight) obtained by dispersing "AKP3000 ™" (manufactured by Sumitomo Chemical, α-alumina having average particle diameter of 550 nm) with homogenizer and ultrasonic dispersion machine |
| Alumina hydrate 1 | Aqueous dispersion (solid content: 7%) of fibrous pseudoboehmite "Cataloid AS-3 ™" (manufactured by Catalysts & Chemicals Ind., having average particle diameter of 100 nm) |

TABLE 4-continued

| Material | Description |
|---|---|
| Alumina hydrate 2 | Aqueous dispersion (solid content: 10%) of plate pseudoboehmite "Cataloid AS-2 ™" (manufactured by Catalysts & Chemicals Ind., having average particle diameter of 25 nm) |
| Binder resin 1 | Aqueous solution (solid content 15%) of "Kuraray Poval PVA-235 ™" (manufactured by Kuraray, polyvinyl alcohol having degree of polymerization of 3500 and degree of saponification of 88%) |
| Binder resin 2 | Aqueous solution (solid content 15%) of "Kuraray Poval PVA-124 ™" (manufactured by Kuraray, polyvinyl alcohol having degree of polymerization of 2400 and degree of saponification of 95%) |
| Colloidal silica 1 | Aqueous dispersion (solid content 40%) of spherical colloidal silica "Snowtex YL ™" (manufactured by Nissan Chemical Industries, Ltd., having average particle diameter of 75 nm) |
| Colloidal silica 2 | Aqueous dispersion (solid content 20%) of pearl necklace-type colloidal silica "Snowtex PL-M ™" (manufactured by Nissan Chemical Industries, Ltd., having average particle diameter of 150 nm) |

TABLE 5

| | Example | | | | | | | |
|---|---|---|---|---|---|---|---|---|
| | 13 | 14 | 15 | 16 | 17 | 18 | 19 | 20 |
| Substrate | a | a | a | a | b | c | a | a |
| Ink-receiving layer | | | | | | | | |
| Alumina 1 | 80 | | | | 80 | 80 | 80 | 80 |
| Alumina 2 | | | | | | | | |
| Alumina hydrate 1 | | 90 | | | | | | |
| Alumina hydrate 2 | | | 90 | 90 | | | | |
| Binder resin 1 | 20 | 10 | 10 | | 20 | 20 | 20 | 20 |
| Binder resin 2 | | | | 10 | | | | |
| Coating dose (g/m²) | 20 | 20 | 20 | 20 | 20 | 20 | 20 | 20 |
| Top coat layer | | | | | | | | |
| Colloidal silica 1 | | | | | | | 90 | |
| Colloidal silica 2 | | | | | | | | 90 |
| Binder resin 1 | | | | | | | 10 | 10 |
| Film evaluation results | | | | | | | | |
| Surface glossiness (%) | 49 | 52 | 55 | 53 | 51 | 56 | 63 | 62 |
| Dye ink | | | | | | | | |
| Ink absorption (naked eye) | ⊙ | ⊙ | ⊙ | ⊙ | ⊙ | ⊙ | ⊙ | ⊙ |
| Bleeding (naked eye) | ○ | ○ | ○ | ○ | ○ | ○ | ○ | ○ |
| Water resistance (naked eye) | ○ | ○ | ○ | ○ | ○ | ○ | ○ | ○ |
| Pigment ink | | | | | | | | |
| Ink absorption (naked eye) | ⊙ | ⊙ | ⊙ | ⊙ | ⊙ | ⊙ | ⊙ | ⊙ |
| Bleeding (naked eye) | ○ | ○ | ○ | ○ | ○ | ○ | ○ | ○ |
| Water resistance (naked eye) | ○ | ○ | ○ | ○ | ○ | ○ | ○ | ○ |

| | Comparative Example | | | | | |
|---|---|---|---|---|---|---|
| | 8 | 9 | 10 | 11 | 12 | 13 |
| Substrate | d | e | d | a | a | a |
| Ink-receiving layer | | | | | | |
| Alumina 1 | 80 | 80 | 80 | | 60 | 97 |
| Alumina 2 | | | | 80 | | |
| Alumina hydrate 1 | | | | | | |
| Alumina hydrate 2 | | | | | | |
| Binder resin 1 | 20 | 20 | 20 | 20 | 40 | 3 |
| Binder resin 2 | | | | | | |
| Coating dose (g/m²) | 20 | 20 | 30 | 20 | 20 | 20 |
| Top coat layer | | | | | | |
| Colloidal silica 1 | | | | | | |
| Colloidal silica 2 | | | | | | |
| Binder resin 1 | | | | | | |
| Surface glossiness (%) | 38 | 52 | 35 | 15 | 51 | 46 |
| Dye ink | | | | | | |
| Ink absorption (naked eye) | △ | △ | ⊙ | X | X | ○ |
| Bleeding (naked eye) | △ | △ | ○ | △ | △ | X |
| Water resistance (naked eye) | ○ | ○ | ○ | X | X | X |
| Pigment ink | | | | | | |
| Ink absorption (naked eye) | △ | △ | ⊙ | X | X | ○ |
| Bleeding (naked eye) | ○ | ○ | ○ | ○ | ○ | X |
| Water resistance (naked eye) | △ | △ | ○ | △ | △ | X |

As Tables 1 to 5 clearly show, the ink jet recording papers of the present invention having an ink-receiving layer containing an inorganic filler and a binder (Examples 1 to 9 and 13 to 18) have high glossiness and favorable ink absorption properties without suffering from bleeding. The surface glossiness is further elevated by forming a top coat layer on the ink-receiving layer (Examples 10 to 12, 19 and 20).

In contrast thereto, ink jet recording papers using porous films excluded from the scope specified in the present invention (Comparative Examples 1, 2, 8 and 9) and ink jet recording papers using ink-receiving layers excluded from the scope specified in the present invention (Comparative Examples 4 to 7 and 11 to 13) fail to satisfy the above-described requirements and are inferior in performance. A comparison of the porous resin films according to the present invention (Examples 1 and 13) with conventional non-absorptive resin films (Comparative Examples 1, 3, 8 and 10) as a substrate indicates that the ink jet recording papers using the porous resin films of the present invention can be produced at a lower cost due to the reduction in the coating dose of the ink-receiving layer.

INDUSTRIAL APPLICABILITY

The ink jet recording papers of the present invention are less expensive ink jet recording papers which have high glossiness and high durability and can quickly absorb ink jet inks.

What is claimed is:

1. An article comprising an ink-receiving layer provided on a porous resin film, wherein the porous resin film has a liquid absorption capacity measured in accordance with "Japan TAPPI No. 51-87" of 0.5 ml/m² or above,
the ink-receiving larger has a surface glossiness, measured according to the JIS-Z8741 method at 60°, of 40% or above, the ink-receiving layer comprises from 70 to 95% by weight of an inorganic filler having an average particle diameter of 350 nm or below and from 5 to 30% by weight of a binder resin, the porous resin film comprises from 30 to 90% by weight of a thermoplastic resin and from 10 to 70% by weight of a fine inorganic powder or an organic powder and the thermoplastic resin is a hydrophilic thermoplastic resin or a mixture of a non-hydrophilic thermoplastic resin with a hydrophilic thermoplastic resin.

2. The article according to claim 1, wherein the non-hydrophilic thermoplastic resin is a polyolefin resin.

3. The article according to claim 1, wherein the water absorption ratio of the hydrophilic thermoplastic resin within 30 minutes is 5 g/g or above or the hydrophilic thermoplastic resin is soluble in water.

4. The article according to claim 1, wherein the hydrophilic thermoplastic resin is a product of a reaction between an alkylene oxide compound and a dicarboxylic acid compound.

5. The article according to claim 1, wherein the average contact angle of the porous resin film to water is 110° or below.

6. The article according to claim 1, wherein the inorganic filler is one or more inorganic fillers selected from the group consisting of alumina, alumina hydrate and amorphous silica.

7. The article according to claim 1, wherein the amorphous silica is an aggregate of primary particles having an average particle diameter of 1 to 10 nm.

8. The article according to claim 1, wherein the amorphous silica is cation-treated silica.

9. The article according to claim 1, wherein the alumina is δ-alumina.

10. The article according to claim 1, wherein the alumina hydrate is pseudoboehmite.

11. The article according to claim 1, wherein the ink-receiving layer further comprises from 1 to 20% by weight of a crosslinking agent and from 1 to 20% by weight of an ink fixer.

12. The article according to claim 1, further comprising a top coat layer on the ink-receiving layer and wherein the surface glossiness, measured according to the JIS-Z8741 method at 60°, of the top coat layer is 50% or above.

13. The article according to claim 1, wherein the top coat layer further comprises 1 to 20% by weight of an ink fixer.

14. The article according to claim 1, wherein the porous resin film has been oriented.

15. The article according to claim 1, wherein the porous resin film has a porosity of 10% or above.

16. The article according to claim 1, wherein the binder resin is one or more water-soluble resins or water-insoluble resins.

17. The article according to claim 16, wherein the water-soluble resin is one or more water-soluble resins selected from the group consisting of polyvinyl alcohol, a derivative of polyvinyl alcohol, polyvinylpyrrolidone, polyacrylamide, hydroxyethylcellulose, casein, and starch.

18. The article according to claim 16, wherein the water-insoluble resin is one or more water-insoluble resins selected from the group consisting of an urethane-based resin, an ester-based resin, an epoxy-based resin, an ethylene-based resin, an ethylene-vinyl acetate copolymer resin, a vinyl acetate-based resin, a vinyl chloride-based resin, a vinyl chloride-vinyl acetate copolymer resin, a vinylidene chloride-based resin, a vinyl chloride-vinylidene chloride copolymer resin, an acrylic acid-based resin, a methacrylic acid-based resin, a polybutyral-based resin, a silicone resin, a nitrocellulose resin, a styrene-acrylic copolymer resin, a styrene-butadiene-based resin, and an acrylonitrile-butadiene copolymer resin.

19. The article according to claim 1, wherein the ink-receiving layer further comprises from 1 to 20% by weight of a crosslinking agent and from 1 to 20% by weight of an ink fixer and the cross-linking agent is one or more cross-linking agents selected from the group consisting of an urea-formaldehyde resin, a melamine-formaldehyde resin, a polyamide polyurea-formaldehyde resin, glyoxal, an epoxy-based crosslinking agent, a polyisocyanate resin, boric acid, borax, and a boric acid salt.

20. The article according to claim 1, wherein the ink-receiving layer further comprises from 1 to 20% by weight of a crosslinking agent and from 1 to 20% by weight of an ink fixer and the ink fixer is one or more ink fixers selected from the group consisting of an inorganic metal salt, a cationic coupling agent, and a cationic polymer.

21. The article according to claim 1, wherein the fine inorganic powder is one or more fine inorganic powders selected from the group consisting of a heavy calcium carbonate, a light calcium carbonate, an aggregated light calcium carbonate, a silica having various pore capacities, a zeolite, clay, talc, titanium oxide, barium sulfate, zinc oxide, magnesium oxide, diatomaceous earth, silicon oxide and composite fine inorganic powders having cores made of hydroxyl group-containing fine inorganic powder.

22. The article according to claim 20, wherein the average particle diameter of the fine inorganic or organic powder ranges from 0.01 to 20 µm.

23. The article according to claim 20, wherein the average particle diameter of the fine inorganic or organic powder ranges from 0.1 to 10 µm.

* * * * *